United States Patent [19]

Bretches et al.

[11] Patent Number: 4,786,717

[45] Date of Patent: Nov. 22, 1988

[54] DEACTIVATION OF ALUMINUM ALKYLS

[75] Inventors: Randall K. Bretches, Houston, Tex.; Andrew J. Sivak, Edgewood Boro, Allegheny County, Pa.; Russell L. Stainfield, Humble, Tex.

[73] Assignee: Aristech Chemical Corporation, Pittsburgh, Pa.

[21] Appl. No.: 928,766

[22] Filed: Nov. 10, 1986

[51] Int. Cl.$^4$ ................................................ C08F 6/02
[52] U.S. Cl. ...................................... 528/491; 526/70; 526/351; 526/352; 556/187
[58] Field of Search ................... 526/71, 70; 528/491; 423/111, 415 R, DIG. 13; 556/187

[56] References Cited

U.S. PATENT DOCUMENTS

| | | | |
|---|---|---|---|
| 3,326,953 | 6/1967 | Gautreaux | 556/187 |
| 3,925,589 | 12/1975 | Sturwold et al. | 528/491 X |
| 4,105,609 | 8/1978 | Machon et al. | 526/84 |
| 4,331,791 | 5/1982 | Rohlfing et al. | 526/125 |
| 4,451,604 | 5/1984 | Mills | 524/313 X |
| 4,504,615 | 3/1985 | Mills | 526/84 X |
| 4,524,182 | 6/1985 | Bauer et al. | 528/491 X |
| 4,525,546 | 6/1985 | Fukawa et al. | 528/491 X |

FOREIGN PATENT DOCUMENTS 0062127  10/1982  European Pat. Off. ............ 528/486

OTHER PUBLICATIONS

Hackh's Chem. Dictionary, Grant, J. (ed.), McGraw-Hill, Inc., N.Y., N.Y. (1969) p. 302.

Primary Examiner—Joseph L. Schofer
Assistant Examiner—F. M. Teskin
Attorney, Agent, or Firm—William L. Krayer

[57] ABSTRACT

Aluminum alkyls are deactivated in a spent hydrocarbon carrier for an olefin polymerization system by the addition of effective amounts of triglycerides.

16 Claims, No Drawings

DEACTIVATION OF ALUMINUM ALKYLS

TECHNICAL FIELD

This invention relates to olefin polymerization processes and particularly to the deactivation of alkylaluminum catalyst in hydrocarbon carriers to be recycled after use. Our invention is particularly useful for the deactivation of triethyl aluminum in hexane or heptane.

A major problem associated with alkylaluminum compounds is their extreme reactivity. The high level of their reactivity is useful in polymerization but can be quite dangerous. They react violently with water and are thermally decomposed to aluminum hydride and aluminum metal. Aluminum hydride and metal also react violently with water to release hydrogen. The dangers of hydrogen are well known. The controlled reaction of water and, e.g., triethyl aluminum (TEA—a commonly used alkylaluminum) is difficult to achieve because the final reaction products are not soluble and thus interfere and stop the intermixing of the water and TEA. The inability properly to mix may result in an uncontrolled reaction. Water may enter a catalyst system from many small and diverse sources, and so is a constant source of concern wherever active alkylaluminum compounds are present.

BACKGROUND ART

Fatty acid salts such as sodium and calcium stearate have been used to deactivate catalyst components in a slurry of polymer after it is manufactured. See U.S. Pat. No. 4,430,488 wherein it is said that the deactivating agent may be added to terminate the polymerization process, (col. 3, line 25) and U.S. Pat. No. 3,876,600 which, in col. 1, lines 30–40, provides a list of agents which have been used in deactivation procedures, including "carboxylic acid esters such as ethyl acetates". The products of deactivation in U.S. Pat. No. 4,105,609, which employs salts of carboxylic acids such as stearic acid, remain in the Polymer (col. 2, lines 1–2). They are separated from the polymer in U.S. Pat. No. 4,430,488.

Water is known to terminate polymerization of olefins—U.S. Pat. No. 4,137,387. Various hydroxyl-containing compounds are used in U.S. Pat. No. 4,460,755; it is stated (col. 3, line 60) that the hydroxyl-containing compound will ultimately be present in the polymerization product. Additional Polyols are recited, including glycerol, in U.S. Pat. No. 4,504,615; however, the primary effect appears to be color stabilization of the product. See also U.S. Pat. No. 4,551,509 (col. 3, line 20).

DISCLOSURE OF INVENTION

We have invented a method of deactivating alkylaluminum catalyst in a hydrocarbon carrier, particularly after it has been used in an olefin polymerization reaction. The deactivating reaction is relatively mild, yet rapid, and the reaction product is relatively stable to heat and water, soluble in the hydrocarbon carrier, and non-volatile at the temperatures and pressures of a typical polyolefin carrier recycling system.

We employ triglycerides having the structure

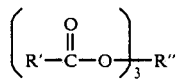

where each R' is independently an organic hydrocarbon radical of up to about 24 carbon atoms. R" is shown below:

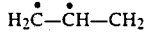

Thus these compositions can be seen to be the result of condensation between fatty acids and glycerin to yield triglycerides.

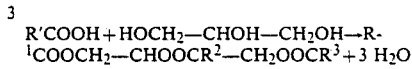

$R^1$, $R^2$ and $R^3$ need not be the same and usually are not. In corn oil the major component is the hydrocarbon group derived from oleic acid, i.e. about 49%.

Generally, the deactivating compounds we use may thus be described as triglycerides wherein the fatty acid portion of the ester is represented by hydrocarbon chains which have from about 1 to about 24 carbon atoms, preferably about 7 to about 23 carbon atoms. Stated another way, they are compounds of the formula

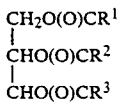

where $R^1$, $R^2$ and $R^3$ are independently selected from normal or branched hydrocarbon radicals having from about 1 to about 24 carbon atoms, preferably about 7 to about 23 carbon atoms, which may have from zero to three unsaturated groups and in which at least one of $R^1$, $R^2$ and $R^3$ has at least 7 carbon atoms. We prefer to use natural fats or oils which have major triglyceride components. Typically the natural fats and oils will contain mono- and diglycerides as well as the triglycerides. Such components will not adversely affect the operation of our invention and in fact they appear to be beneficial.

Among the unbranched saturated fatty acids which may form the R (ester) groups of the triglycerides are octanoic (caprylic), decanoic (capric), dodecanoic (lauric), tetradecanoic (myristic), hexadecanoic (palmitic), octadecanoic (stearic), eicosanoic (arachidic), docosanoic (behenic) hexacosanoic (cerotic), octacosanoic (montanic), and triacontanoic (mellissic). These fatty acids are found as components of the mono-, di- and triglycerides (primarily triglycerides) in various milk fats, palm seed oil, sperm head oil, coconut oil, palm oil, various animal fats, peanut oil, plant waxes and beeswax, among other natural sources in marine and terrestrial life.

Branched saturated acids, i.e. 10-methylstearic, may also be useful as glyceride components. Among the useful monoenoic fatty acid components are 9-decenoic (caproleic), 9-tetradecenoic (myristoleic), 9-hexadecenoic (palmitoleic), 6-octadecenoic (petroselinic), 9-octadecenoic (oleic), and 13-docosenoic (erucic). Glycerol derivatives including such mono-unsaturated fatty acid esters may be found in a great variety of fats and marine oils; in addition, parsley seed oil is a notable source of petroselinic acid and rapeseed oil contains significant portions of erucic acid.

Glycerides in which $R^1$, $R^2$ or $R^3$ is di-unsaturated include 2,4-decadienoic acid (stillingic), 9,12- octadecadienoic (linoleic), and 13,16-docosadienoic. Notable tri-unsaturated fatty acids are 6,10,14-hexadecatrienoic, 6,9,12 octadecatrienoic (linolenic), 5,8,11-eicosatrienoic, 8,11,14-eicosatrienoic, and 9,11,13-octadecatrienoic. Sources for triunsaturated groups in the triglycerides include sardine oil, linseed oil, shark liver oil and tung oil. Some more unusual compositions are derived from 8,9-methylene-9-octadecenoic acid.

While any mono-, di- or triglyceride of the above general formula may be used, we prefer to employ the natural triglycerides as they are found in the natural fats and oils suggested above. A particularly preferred oil is corn oil because of its ready availability in relatively pure and consistent form. A typical analysis of corn oil finds that it is predominantly triglycerides; the fatty chains are derived about 50% from oleic acid, about 34% linoleic acid, about 10% palmitic acid, and the balance other condensed acids, with less than one percent free fatty acids. Variable amounts of the fatty chains are present in the form of mono- and diglycerides.

Our deactivating agents are added to the hydrocarbon carrier after it has been separated from the polymer. Typically a polymer such as polypropylene, polyethylene or a copolymer of ethylene and propylene is separated from the carrier-solvent such as heptane or hexane in a centrifuge soon after manufacture. To reduce the danger of build-up of trialkyl aluminum ("TAA") resulting in spontaneous reaction with itinerant water or oxygen, and for various other reasons, it is desirable to deactivate the TAA before the solvent-carrier is volatilized for recycling. In our procedure, the corn oil having reacted with the triethyl aluminum ("TEA") catalyst is removed with the atactic polypropylene, which is insoluble in the solvent-carrier n-hexane.

While any amount of triglyceride will be effective to some degree, we prefer to add the triglyceride in a molar ratio of aluminum to triglyceride of about 1:1 to about 6:1.

We have inferred from the IR results that the net reaction

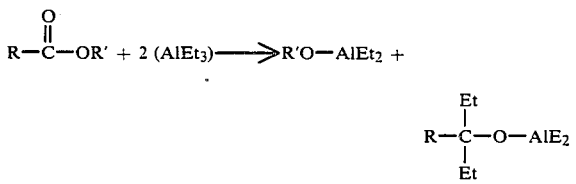

takes place.

For the experimental results discussed below, standard Schlenk techniques were employed. Mazola corn oil was obtained from a grocery store and used without further purification. A solution of 5.6 g of corn oil was dissolved in 150 ml freshly distilled n-heptane. An IR spectrum was collected. An additional 5.81 g of corn oil were added and another IR collected. These solutions were used to calculate $\epsilon$ for free "C=O". To the corn oil solution 8.2 ml aliquots of TEA solution (13.05 mmol) in n-hexane were sequentially added.

The IR cell spacing was determined to be 0.0371±0.0004 mm by collecting the spectrum of the blank cell. The cell was made of KCl plates and it was purged with heptane and argon between samples.

The reaction of TEA with corn oil was followed by making a standard solution of corn oil in n-heptane and sequentially adding up to 12 equivalents of TEA (in 1 equivalent increments up to Al/"oil"=7 and then a 5 equivalent aliquot—the oil was assumed to be pure tri-oleic glyceride). At the molar ratios Al/"oil"=1, 2, 3, 4, 5, 6, 7, and 12 the IR spectrum was collected immediately after the TEA addition and after various periods of time to ascertain what rate of change, if any, existed. The peaks for the "free" carbonyl functionality, the "complexed" carbonyl functionality, and the Al-O and/or Al-C bonds were readily apparent. The peaks appear at ~1753, 1668–1675, and 630–660 cm$^{-1}$, respectively.

A steady increase for the peak due to Al-O was observed as concentration of corn oil is increased and as residence time is increased, indicating the completion of the net reaction described above. Ratios of triglyceride to aluminum greater than about 1:1 will yield diminishing returns, however; thus our Preference is a range of aluminum to triglyceride of about 1:1 to about 6:1.

While we are confidant that our experiments and results are sound, we do not intend to be bound by any theories as to the mechanism of the reactions discussed herein.

Our invention is applicable to any olefin polymerization process wherein a hycrocarbon solvent or carrier is used; temperatures may vary between 70° F. and 180° F. and pressures from 1 to 10 atmospheres. The reaction time will vary with temperature—as much as 20 minutes may be required at room temperature. The polyolefin may be polypropylene, polyethylene, or a copolymer of ethylene and propylene or either with minor amounts of other monomers such as butene or hexene. The aluminum compound may be any of the aluminum alkyl compounds commonly used in olefin polymerization, typically aluminum diethyl and aluminum triethyl.

We may use any natural fat or oil derived from land animals, marine animals or plants which contains a glyceride of the above general formula.

Our invention includes the recycling of the hydrocarbon solvent after the aluminum triethyl has been neutralized by our treatment with the triglycerides or natural oils containing them. To recycle, we may first remove from the solvent the reaction products of the neutralization step by distillation.

BEST MODE FOR CARRYING OUT THE INVENTION

In practice, the following procedure is useful.

In a polypropylene plant employing a hydrocarbon solvent such as n-heptane or n-hexane for the reactants and catalyst, and in which it is desired to recycle the solvent, the triethyl aluminum may be deactivated immediately after the solid polypropylene product is separated from the hydrocarbon solvent. In a continuous process, the solvent containing polymerized propylene and residual catalyst is typically passed through a centrifuge to remove the polypropylene product. The n-hexane or n-heptane may then be treated in a continuous manner by injecting into it a triglyceride-containing material such as corn oil in a molar ratio of, preferably, about 1:3 to the TEA content of the solvent. The ratio may be varied as a function of the temperature and pressure of the solvent. Since it is preferred in the polymerization process to maintain the solvent (hexane or heptane) at a temperature between about 45° C. and about 65° C., the ratio may desirably be maintained at about 1 to about 5.

Following such a procedure under commercial conditions, triethyl aluminum has been deactivated, as indicated by checking for active aluminum at points downstream from the point of corn oil addition to the hexane solvent after polypropylene product removal. Corn oil injected to the stream of hexane containing active triethyl aluminum at a molar ratio of about 3:1 of triethyl aluminum to corn oil resulted consistently in an active aluminum content in the "bottoms" of the commercial process, i.e. after vaporization of the hexane for recycle of less than ten percent of the typical active aluminum content without treatment. Active aluminum content has also been monitored in a portion of a plant where the aluminum tends to build up because of recyling; here, also, the reduction in quantity of active aluminum has been significant.

We claim:

1. Method of deactivating alkylaluminum catalyst in a hydrocarbon carrier comprising reacting said alkylaluminum catalyst with a triester of glycerol wherein said ester group has independently up to about 24 carbon atoms, in an amount sufficient to effect deactivation.

2. Method of claim 1 wherein the catalyst is triethyl aluminum.

3. Method of claim 1 wherein the triester of glycerol is contained in core oil.

4. Method of claim 1 wherein the treester of glycerol is contained in a natural fat or oil.

5. Method of claim 1 wherein the triester of glycerol has the general formula

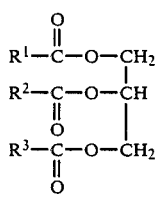

where $R^1$, $R^2$ and $R^3$ are independently selected organic hydrocarbon radicals having up to about 24 carbon atoms and up to threee unsaturated groups, and wherein at least one of $R^1$, $R^2$ and $R^3$ has at least 7 carbon atoms.

6. Method of claim 1 wherein the hydrocarbon carrier is n-hexane.

7. Method of claim 1 wherein the hydrcarbon carrier is n-heptane.

8. Method of claim 1 wherein the triester of glycerol is contacted with the alkylaluminum in a ratio of from about 1:1 to about 6:1.

9. Method of claim 1 followed by recycling the hydrocarbon carrier to a polymerization process.

10. Method of treating an olefin polymerization reaction product which includes a hydrocarbon solvent, a polyolefin product, and residual triethyl aluminum, comprising separating the polyolefin product from the hydrocarbon solvent and triethyl aluminum, adding to the solvent an amount of a triester of glycerol, each ester group of said triester of glycerol having independently up to about 24 carbon atoms effective to neutralize the triethyl aluminum, and recycling the solvent for re-use in the olefin polymerization reaction.

11. Method of claim 10 wherein the triester of glycerol is a component of a natural fat or oil.

12. Method of claim 10 wherein the temperature of the solvent on addition of the triester of glycerol is from about 70° F. to about 180° F.

13. Method of claim 10 wherein the hydrocarbon solvent is n-hexane.

14. Method of claim 10 wherein the hydrocarbon solvent is n-heptane.

15. Method of claim 10 wherein the polyolefin is polypropylene.

16. Method of claim 10 wherein the triester of glycerol has the general formula

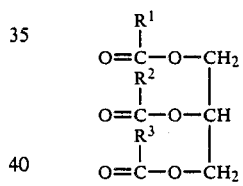

wherein each of $R^1$, $R^2$ and $R^3$ is independently selected from organic hydrcarbon radicals having about 7 to about 23 carbon atoms and up to three unsaturated groups.

* * * * *

UNITED STATES PATENT AND TRADEMARK OFFICE
CERTIFICATE OF CORRECTION

PATENT NO. : 4,786,717

DATED : November 22, 1988

INVENTOR(S) : Randall K. Bretches, Andrew J. Sivak, Russell L. Stainfield

It is certified that error appears in the above-identified patent and that said Letters Patent is hereby corrected as shown below:

Column 1, line 48, change "Polyols" to -- polyols --.

Column 2, line 5, change "$H_2\overset{..}{C}-\overset{.}{C}H-CH_2$" to -- $H_2\overset{..}{C}-\overset{..}{C}H-\overset{..}{C}H_2$ --.

Column 4, line 19, change "Preference" to -- preference --.

Column 5, line 22, claim 1, change "said" to -- each --;
          line 29, claim 4, change "treester" to -- triester --;
          line 44, claim 5, after "having", insert -- about --;
          same line, claim 5, before "24", delete "about".

line 45, claim 5, change "threee" to -- three --.

Signed and Sealed this

Twenty-second Day of August, 1989

*Attest:*

DONALD J. QUIGG

*Attesting Officer*  *Commissioner of Patents and Trademarks*